United States Patent
Tucker et al.

(10) Patent No.: US 9,620,941 B2
(45) Date of Patent: Apr. 11, 2017

(54) INTELLIGENT TELECOMMUNICATIONS PATCHING SYSTEM

(71) Applicant: CommScope, Inc. of North Carolina, Hickory, NC (US)

(72) Inventors: Peter T. Tucker, Dallas, TX (US); Mark A. Hejnicki, Frisco, TX (US); Michael G. German, Secaucus, NJ (US); Matias Peluffo, El Casar de Talamanca (ES); Doyle J. Barras, Murphy, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 615 days.

(21) Appl. No.: 13/911,767

(22) Filed: Jun. 6, 2013

(65) Prior Publication Data

US 2013/0329344 A1 Dec. 12, 2013

Related U.S. Application Data

(60) Provisional application No. 61/658,194, filed on Jun. 11, 2012.

(51) Int. Cl.
*G05B 23/02* (2006.01)
*H02B 15/00* (2006.01)
*H04Q 1/02* (2006.01)

(52) U.S. Cl.
CPC .............. *H02B 15/00* (2013.01); *H04Q 1/136* (2013.01); *Y10T 29/49117* (2015.01)

(58) Field of Classification Search
CPC ...... H02B 15/00; H04Q 1/36; Y10T 29/49117
(Continued)

(56) References Cited

U.S. PATENT DOCUMENTS 6,330,307 B1 * 12/2001 Bloch .................... H04Q 1/136
340/8.1
2002/0052941 A1 * 5/2002 Patterson .............. G06F 9/5061
709/223
(Continued)

FOREIGN PATENT DOCUMENTS

EP 1734692 12/2006
WO 2010065807 6/2010
(Continued)

OTHER PUBLICATIONS

United Kingdom Patent Office, "Combined Search and Examination Report for GB Application No. GB1310244.7", "from Foreign Counterpart to U.S. Appl. No. 13/911,767", Dec. 9, 2013, pp. 13, Published in: GB.

Primary Examiner — Ojiako Nwugo
(74) Attorney, Agent, or Firm — Fogg & Powers LLC

(57) ABSTRACT

A telecommunications patching system having point-to-point tracing capabilities includes: a plurality of end devices; at least one rack structure; a plurality of patch panels mounted to each rack structure; a plurality of connector ports disposed on each of the patch panels; a plurality of patch cords for selectively interconnecting different pairs of connector ports; a plurality of cables for selectively interconnecting the connector ports on the patch panels with respective end devices; tracing modules associated with said connector ports and end devices that monitor connectivity of the connector ports and end devices; and a display associated with the tracing modules configured to display the connectivity of a circuit comprising one or more of the connector ports and one or more of the end devices.

12 Claims, 3 Drawing Sheets

(58) Field of Classification Search
USPC ..... 340/3.1; 324/66; 361/633; 439/404, 54.1
See application file for complete search history.

(56) References Cited

U.S. PATENT DOCUMENTS

| | | |
|---|---|---|
| 2008/0049627 A1 | 2/2008 | Nordin |
| 2010/0141379 A1 | 6/2010 | Tucker |
| 2011/0008996 A1 | 1/2011 | Pinn et al. |
| 2011/0043333 A1* | 2/2011 | German ................ H04Q 1/136 340/10.1 |
| 2012/0188865 A1 | 7/2012 | Michaelis et al. |
| 2012/0198246 A1 | 8/2012 | German |
| 2014/0141643 A1* | 5/2014 | Panella .................... H04Q 1/13 439/391 |

FOREIGN PATENT DOCUMENTS

| | | |
|---|---|---|
| WO | 2011008525 | 11/2011 |
| WO | 2012102956 | 8/2012 |

\* cited by examiner

INTELLIGENT TELECOMMUNICATIONS PATCHING SYSTEM

RELATED APPLICATION

The present application claims priority from and the benefit of U.S. Provisional Patent Application No. 61/658,194, filed Jun. 11, 2012, the disclosure of which is hereby incorporated by reference herein in its entirety.

FIELD OF THE INVENTION

The present invention relates generally to communications patching systems, and more particularly to intelligent communications patching systems.

BACKGROUND

FIG. 1 illustrates a patching system 10 that may be used to connect computers, printers and other "work area" end devices 20 to network equipment that is located in a computer room 14. The patching system of FIG. 1 may also be used to interconnect devices in a data center. As shown in FIG. 1, an end device 20 (which is illustrated as being a computer, but could be other end devices such as printers, facsimile machines, etc.) that is located in a work area 12 is connected by a patch cord 22 (a patch cord is a cable that has a plug connector on at least one end thereof) to a modular wall jack 24. A so-called "horizontal" communications cable 28 is routed from the back end of the wall jack 24 through the walls of the building to the computer room 14. While only a single work area end device (computer 20) is shown in FIG. 1, it will be appreciated that a typical system includes hundreds or thousands of work area end devices 20, wall jacks 24 and horizontal cables 28.

As is further shown in FIG. 1, a plurality of patch panels 32 are mounted on a first equipment rack 30 in the computer room 14. A patch panel refers to a frame that includes a plurality (e.g., 24) of connector ports 34 mounted thereon. Each of these connector ports 34 has a back end that receives a communications cable (e.g., a cable 28) and a front side that includes a plug aperture that receives the plug of a patch cord. The connector ports 34 are used to electrically connect a patch cord to a communications cable. Each horizontal cable 28 from the wall jacks 24 in the work area 12 is terminated onto the back end of one of the connector ports 34 of one of the patch panels 32. A second set of patch panels 32' that have connector ports 34' are mounted on a second equipment rack 30'. A first set of patch cords 50 is used to interconnect the connector ports 34 on the patch panels 32 to respective connector ports 34' on the patch panels 32'. Rack controllers 36 are provided on each equipment rack 30, 30' that pass information from the patch panels 32, 32' to a system administrator computer (not shown), as is discussed below.

Network devices such as network switches 42 and network routers and/or servers 46 are mounted on a third equipment rack 40. Each of the network switches 42 has a plurality of connector ports 44, and each network router and/or server 46 also includes one or more connector ports. An external communications line 52 is connected to one of the network devices 46. A second set of single-ended patch cords 70 connect the connector ports 44 on the network switches 42 to respective ones of the back ends of the connector ports 34' on the patch panels 32'. A third set of patch cords 54 interconnect other of the connector ports 44 on the switches 42 with the connector ports on the network routers/servers 46. The cables 28, patch panels 32, 32' and patch cords 50, 70 are used to connect each wall jack 24 to a respective connector port 44 on the network switches 42.

Communications from a particular work area end device (e.g., computer 20) are transmitted over the patch cord 22, through the wall jack 24, over the cable 28, and through the patch panels 32, 32' and patch cords 50, 70 to one of the network switches 42, and this network switch 42 then routes those communications towards their intended destination (e.g., to another work area device 20, a network device 46, or to the external communication line 52 for transmission over the Internet). The network switches 42 likewise receive communications from internal or external sources and route these communications to the intended work area devices 20.

It may become necessary to change the connections between particular modular wall jacks 24 and the connector ports 44 on the network switches 42 for a variety of reasons such as employee office moves, providing additional capabilities (e.g., support for an Internet telephone) to particular offices and the like. The patch panels 32, 32' are provided to facilitate such connectivity changes, as a system administrator need only rearrange one of the patch cords 50 that interconnect a connector port 34 on one of the patch panels 32 with respective connector port 34' on one of the patch panels 32' to effect an end-to-end connectivity change that connects a particular end device 20 to a different connector port 44 on one of the network switches 42. Each time such a connectivity change is made the change is recorded in a computer-based connectivity log that keeps track of all of the connections between the wall jacks 24 and the connector ports 44 on the network switches 42.

The system of FIG. 1 is referred to as a "cross-connect" patching system, as two separate sets of patch panels 32, 32' are provided, and connectivity changes are made by rearranging the patch cords 50 that extend between the two sets of patch panels 32, 32'. In another configuration that is referred to as an "interconnect" patching system, the second set of patch panels 32' and the second set of patch cords 70 are omitted, and instead the connector ports 34 on the first set of patch panels 32 are connected directly to the connector ports 44 on the network switches 42 by the patch cords 50. Interconnect patching systems require less equipment, but as is discussed below, may have less capabilities.

Unfortunately, computer-based connectivity logs often are replete with errors because of incorrect entries or because a technician forgets to enter a particular connectivity change into the log. In complex networks, it can be very difficult to identify and correct there errors. Accordingly, various "intelligent" patching systems have been proposed that sense connectivity changes and automatically update the computer-based connectivity log each time such changes are made.

One such patching system (available from CommScope, Inc., Hickory, N.C. under the name iPATCH) includes so-called "intelligent" patch panels 32, 32' that work in conjunction with the rack controllers 36 and "system administrator" software (which runs on a control computer) to automatically track the connections between each wall jack 24 and its respective connector port 44 on one of the network switches 42. This system may be implemented in both cross-connect and interconnect patching configurations.

The system uses "intelligent" patch panels 32, 32' that include sensors on each connector port 34, 34' that detect each time the plug on a patch cord 50 is plugged into, or removed from, the connector ports 34, 34'. Each connector port 34, 34' also includes an associated light-emitting diode ("LED") 60 (see FIG. 1A) that may be automatically lit to help guide a technician to the connector port 34, 34', and may also have an associated trace button that a technician may press in order to light the LED on the connector port 34, 34' that the far end of a patch cord 50 is plugged into. Operations of the system will now be explained in the cross-connect and interconnect environments, respectively.

When the horizontal cabling 28 for a cross-connect patching system is first installed, a connectivity database is created, and the system administrator installing the network records in this database the connections between each wall jack 24 and its associated connector port 34 on the patch panels 32. As the horizontal cables 28 are hard-wired (as opposed to plug-in) connections that run through the walls of the building, these connections are assumed to be constant connections that never change. The system administrator likewise manually inputs into the connectivity database the connections between the connector ports 44 on each network switch 42 and their corresponding connector ports 34' on the patch panels 32' (i.e., the administrator enters into the connectivity database the end points of each single-ended patch cord 70 in FIG. 1). While these connections are more subject to change (since each patch cord 70 has a plug on one end thereof that plugs into one of the switch connector ports 44), once again it is assumed that these connections will not change (or at least that if they do change, the administrator will update the connectivity database to reflect these changes). Thus, the connections between the wall jacks 24 and the patch panels 32 are known in advance, as are the connections between the network switches 42 and the patch panels 32'. What is not known are the connections formed by the patch cords 50 between the patch panels 32 and the patch panels 32'. These connections are automatically determined by the aforementioned cross-connect system as follows.

When a new patch cord 50 is to be connected between the patch panels 32 and 32', the sensor on the connector port 34, 34' that the first end of this new patch cord 50 is plugged into senses the plug insertion, and notifies the system administrator software (via the rack manager 36) of this plug insertion. Thereafter the second end of the new patch cord 50 is plugged into another of the connector ports 34, 34', and the system administrator software then assumes that these two back-to-back plug insertions represent the two ends of a new patch cord 50 that has been connected between the patch panels 32 and 32'. Since the sensors associated with each of the connector ports 34, 34' will sense these two patch cord insertions, the system is able to automatically identify the connector ports 34, 34' that the new patch cord 50 extends between. This information is added to the connectivity database.

The system also automatically tracks the removal of any of the patch cords 50 and/or changes in the connections formed by any of the patch cords 50. For example, if a patch cord 50 is removed from one of the connector ports 34 or 34', this removal is sensed by the sensor on the connector ports 34, 34'. Since the iPatch system already knows exactly which connector port 34, 34' the other end of the patch cord 50 is connected to, the iPatch system then lights the LED associated with that connector port 34, 34' to help the technician find the far end of the patch cord 50. The system administrator can then remove the second end of the patch cord 50, which removal is sensed by the sensor on the connector port 34, 34'. After both ends of the patch cord 50 have been removed, the connection that was previously formed by the patch cord 50 at issue may be deleted from the connectivity database. If the administrator only unplugs one end of one of the patch cords 50 (which removal is sensed by the system) and then proceeds to plug the free end of the patch cord 50 into another one of the connector ports 34, 34', the system will sense that a patch cord insertion was performed immediately after a patch cord removal as opposed to two patch cord removals occurring back-to-back. In response to sensing such a sequence of events, the system will then ask the system administrator to confirm that he is changing a connection (i.e., unplugging one end of one of the patch cords 50 and then plugging it back into a different connector port 34, 34') as opposed to removing the patch cord 50 at issue in its entirety. Once the system administrator confirms that a connection change is being made, the system can automatically change the connection information stored in the connectivity database to reflect the connection change. In this manner, the system can automatically track the addition of new connections, the removal of existing connections, and changes to existing connections, and may thus automatically maintain an accurate connectivity database that tracks the connections between each connector port 44 on the network switches 42 and their corresponding modular wall jacks 24.

Some patching systems can automatically gather and store additional information regarding the network connections. In such an embodiment, the system administrator software sends control communications to the network switches 42 using Simple Network Management Protocol or "SNMP" commands to access information that is stored in memory at each network switch 42 such as the switch's name, number of connector ports 44, etc. Each network switch 42 also automatically generates a table that contains (1) the MAC address for each end device 20 that is communicating through the switch 42 (the MAC address is a unique identifier for each end device 20, and is automatically sensed by the network switch 42 once a device starts communicating through a network switch 42) and (2) the connector port 44 on a particular network switch 42 that each such end device 20 is connected to. The system may also use SNMP commands to pull this information from each network switch 42 for storage in the connectivity database. The system may also query an Address Resolution Protocol table (which may be resident on the network switches 42 or located elsewhere in the network) in order to convert each MAC address to an IP address for each end device 20. Thus, in this manner, the system can automatically track both (1) the physical connections between each modular wall jack 24 and its associated connector port 44 on one of the network switches 42 and (2) the identity of each end device 20 that is accessing the network via the wall jacks 24.

There are two different ways that the system may ensure that the identification information regarding the end devices 20 is kept up to date in the connectivity database. The first way is to simply schedule periodic checks (e.g., once an hour) where the system sends SNMP commands to each network switch 42 to request an update regarding the end devices 20 that are connected through the switches 42. Alternatively, each network switch 42 can send out notifications called SNMP traps each time the network switch 42 senses that a new end device 20 has been connected to the switch 42 (i.e., the network switch 42 sends out an SNMP trap each time the network switch 42 establishes a communication link with a new end device 20). In response to this SNMP trap, the system may then request information on the new end device 20 from the network switch 42. Monitoring end devices in this fashion may be useful, for example, for security purposes.

As noted above, patching systems may also be used to track an "interconnect" configuration. However, as commercially available network switches 42 do not include sensors at each connector port 44, the system can only automatically track one end of each patching connection (recall that in an interconnect-style network the patch cords 50 extend between the patch panels 32 and the network switches 42, as the patch panels 32' are omitted). To compensate for this, the system can generate a work order each time it is necessary to add, remove or change a connection. Each such work order specifies the connector port 34 on one of the patch panels 32 and the connector port 44 on one of the network switches 42 that are implicated by the connection change. Once the technician makes the connection to the particular connector port 44 on the network switch 42 that is specified in the work order, the technician notifies the system administrator software that the connection has been completed by pressing the trace button associated with the connector port 34 on the patch panel 32 that receives the other end of the patch cord 50. This system is not foolproof, because it will not detect situations where the technician mistakenly plugs the patch cord 50 into the incorrect connector port 44 on the network switch 42.

It will be appreciated that the patching system of FIG. 1 is highly simplified and provided for the purposes of illustration only. Patching systems will typically include tens, hundreds, thousands or tens of thousands of patch panels, which may be subdivided into tens or hundreds of local patching fields. Additional details regarding intelligent patching systems are set forth in U.S. patent application Ser. No. 13/110,994, filed May 19, 2011, the disclosure of which is hereby incorporated herein by reference in its entirety.

SUMMARY

As a first aspect, embodiments of the invention are directed to a telecommunications patching system having point-to-point tracing capabilities. The patching system comprises: a plurality of end devices; at least one rack structure; a plurality of patch panels mounted to each rack structure; a plurality of connector ports disposed on each of the patch panels; a plurality of patch cords for selectively interconnecting different pairs of connector ports; a plurality of cables for selectively interconnecting the connector ports on the patch panels with respective end devices; tracing modules associated with said connector ports and end devices that monitor connectivity of the connector ports and end devices; and a display associated with the tracing modules configured to display the connectivity of a circuit comprising one or more of the connector ports and one or more of the end devices.

As a second aspect, embodiments of the present invention are directed to a method of interconnecting telecommunications devices, comprising the steps of: (a) providing an intelligent patch system having: a plurality of end devices; at least one rack structure; a plurality of patch panels mounted to each rack structure; a plurality of connector ports disposed on each of the patch panels; a plurality of patch cords for selectively interconnecting different pairs of connector ports; a plurality of cables for selectively interconnecting the connector ports on the patch panels with respective end devices; tracing modules associated with said connector ports and end devices that monitor connectivity of the connector ports and end devices; and a display associated with the tracing modules configured to display the connectivity of a circuit comprising one or more of the connector ports and one or more of the end devices; (b) moving one of the patch cords from one of the connector ports to another of the connector ports; and (c) illuminating on the display a new patching circuit formed by the patch cord moved in step (b) to verify the correctness of the new patching circuit.

As a third aspect, embodiments of the present invention are directed to a telecommunications patching system having point-to-point tracing capabilities, comprising: a plurality of end devices; at least one rack structure; a plurality of patch panels mounted to each rack structure; a plurality of connector ports disposed on each of the patch panels; a plurality of patch cords for selectively interconnecting different pairs of connector ports; a plurality of cables for selectively interconnecting the connector ports on the patch panels with respective end devices; tracing modules associated with said connector ports and end devices that monitor connectivity of the connector ports and end devices; and a controller configured to display search results regarding the end devices, patch panels, ports, patch cords and cables.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
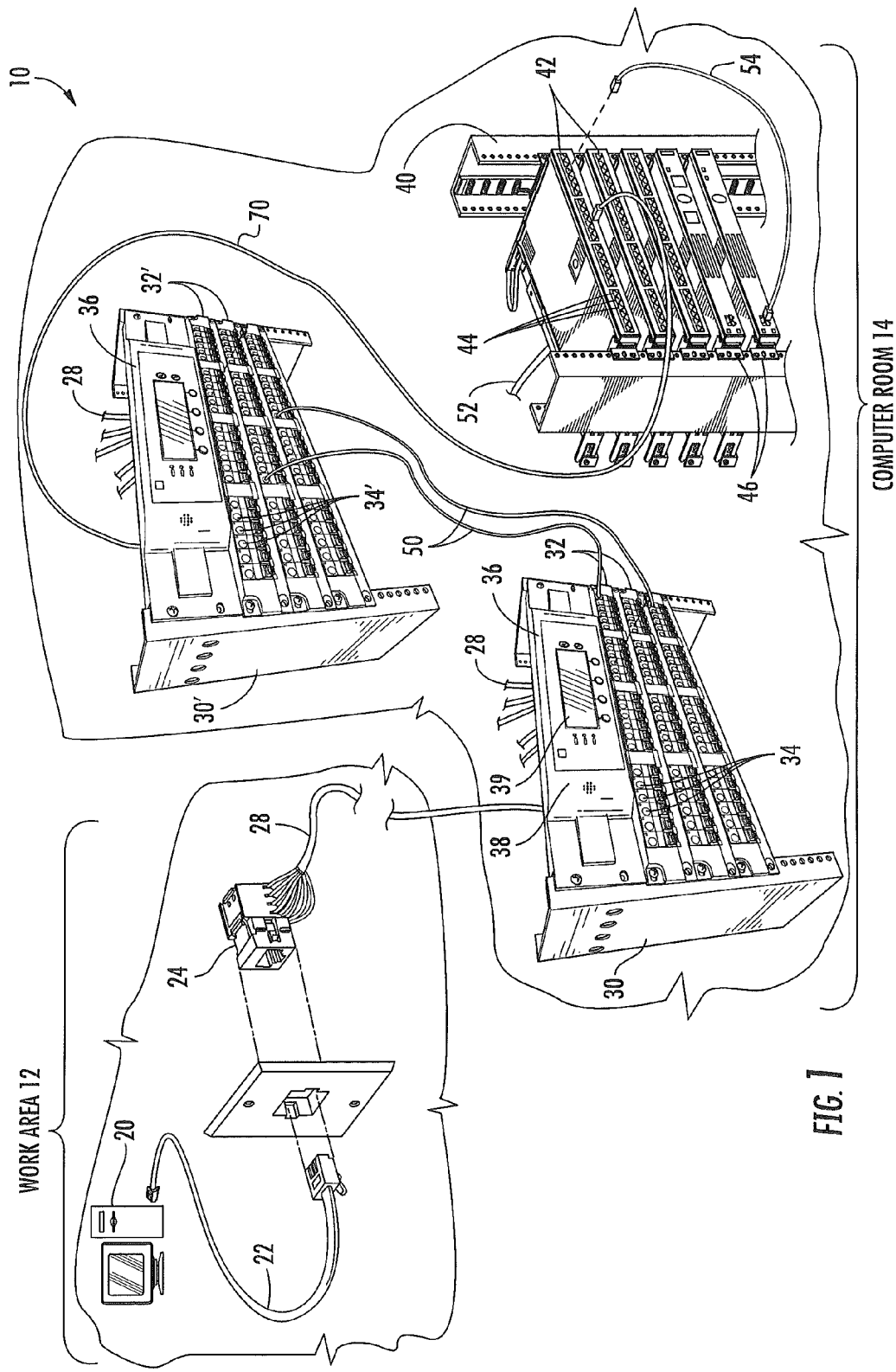
FIG. 1 is a schematic illustration of a patching system that may be used to connect computers, printers and other "work area" end devices to network equipment that is located in a computer room, or to connect end devices in a data center.

As discussed above and illustrated in FIG. 1, intelligent patching systems are known and are widely used in the field today. Nonetheless, intelligent patching systems may benefit from additional features, some of which are intended to provide additional information to cabling technicians working at a rack populated with intelligent patching equipment.

Figure 1A:
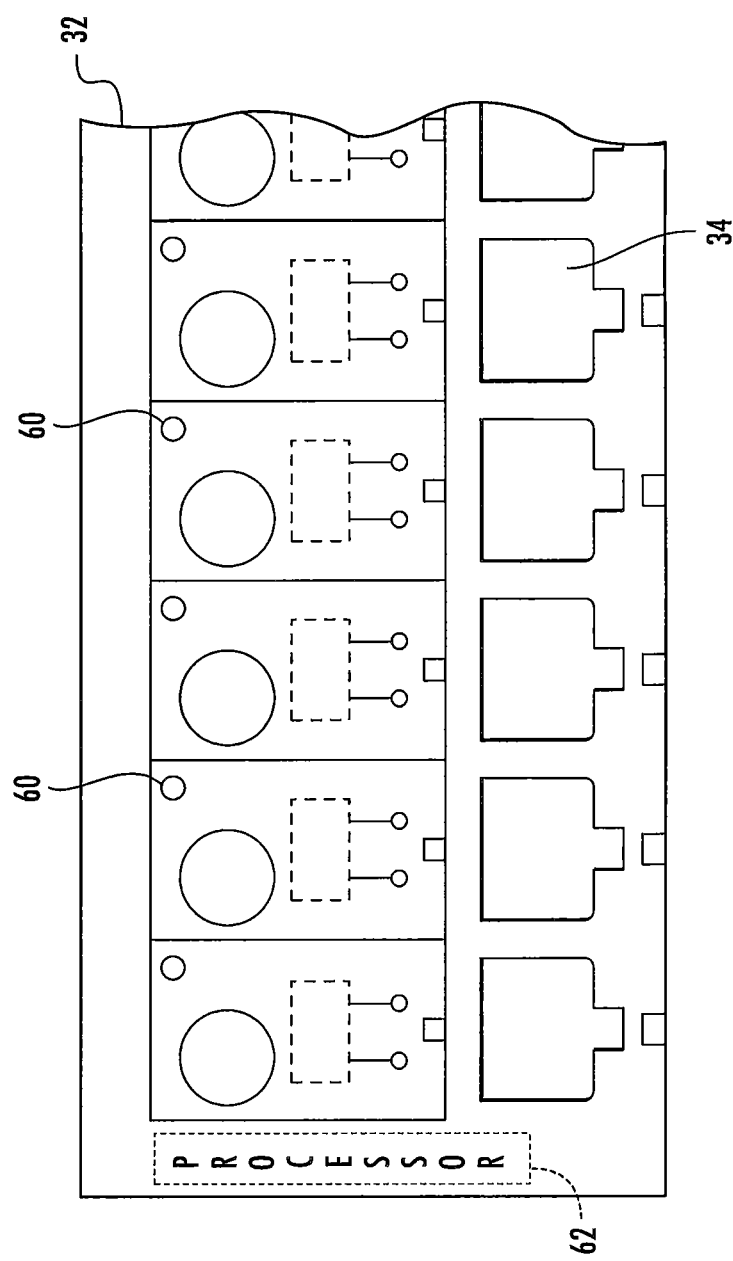
FIG. 1A is a greatly enlarged front view of a portion of a patch panel according to embodiments of the invention.

As one example, an intelligent patching system may include the capability of real-time end-to-end circuit display during patching or circuit trace activity. When the user inserts or removes a patch cord plug at a patch panel or presses the trace button over a patch panel connector port, the rack controller or tracer module 62 (FIG. 1A) may display graphically the portion of the circuit in question that is located in the local patching field. However, it may also issue a query in real time to the system manager database, requesting end-to-end circuit trace information for the circuit in question. Because the database includes information about the cabling infrastructure and the connectivity of fixed cables at the site, when the requested trace information is received from the system manager, the rack controller can supplement the circuit trace it originally displayed to show the endpoints of the circuit; the user may also have the option of expanding the trace so he can scroll through a trace of the entire end-to-end circuit. Thus, the user can view not only information regarding patching at the patch panels themselves, but also information about the connectivity of fixed cabling at the site.

The information may be displayed on a monitor of a desktop or laptop computer, a GUI interface, a touchscreen, a tablet, a "smart phone", or the like. Bluetooth or Near Field Communication wireless connections may be used with the table, smart phone, etc.

Figure 2:
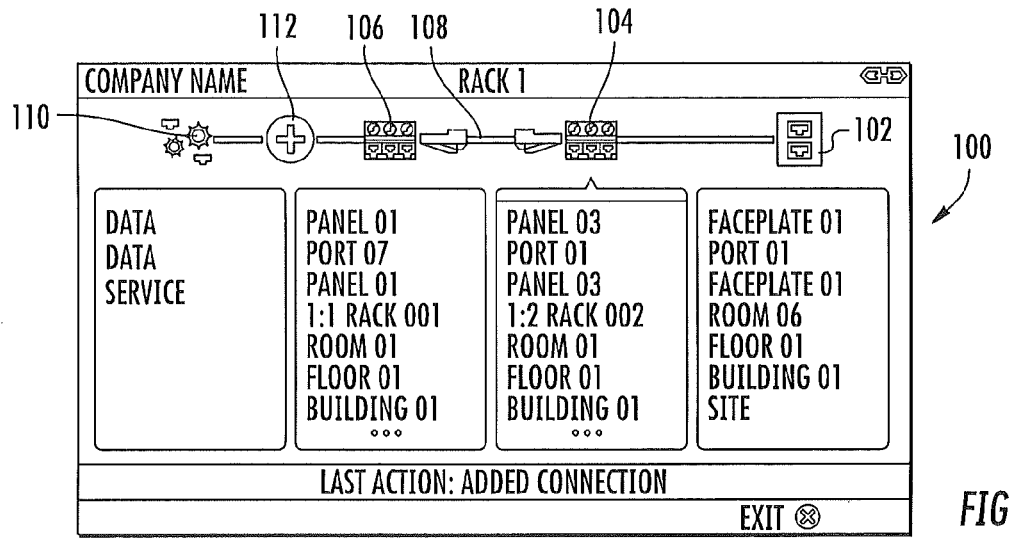
FIG. 2 is an exemplary display screen image of a connection circuit that can be employed in the patching system of FIG. 1.

An exemplary display 100 of the circuit information for a cross-connect arrangement is shown in FIG. 2. In the display of FIG. 2, a faceplate icon 102 represents the location of the wall jack 24 of the circuit; details identifying the location of the wall jack are set forth on the display 100 below the icon 102. Panel icons 104, 106 represent the connector ports 34, 34' on patch panels 32, 32' that are included in the circuit, with identifying information regarding these connector ports 34, 34' set forth below the icons 104, 106. A patch cord icon 108 illustrates a connection between the icons 104, 106. A data service icon 110 represents the external data service.

Figure 3A:
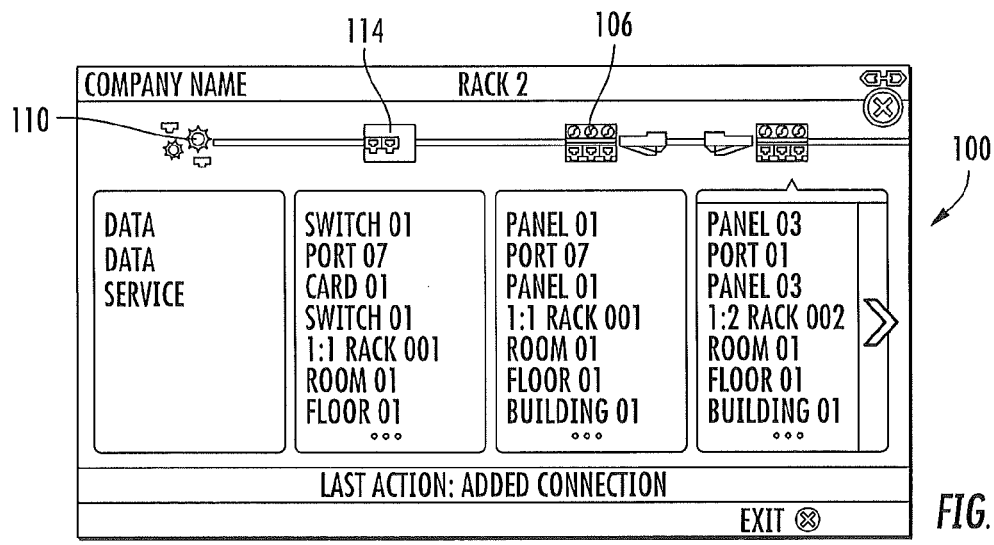
FIG. 3A is the screen image of FIG. 2 with the "+" icon expanded.
Figure 3B:
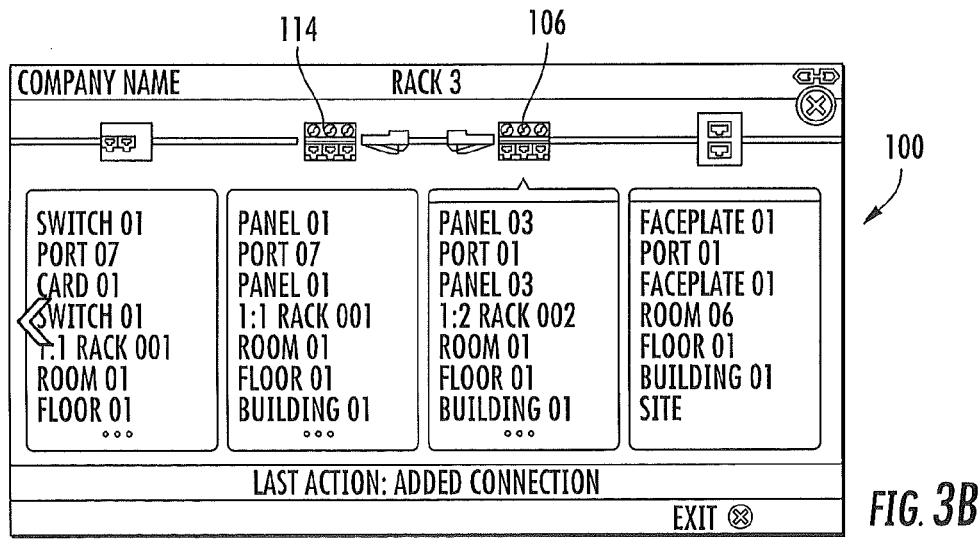
FIG. 3B is the screen image of FIG. 3A shifted horizontally to display different icons.

A "+" icon 112 is also shown between the data service icon 110 and the patch panel icon 106. This icon 112 can be expanded (via touch screen, mouse click or the like) to display additional information or connections within the circuit. FIG. 3A shows the display of FIG. 2 with the "+" icon 112 expanded to reveal information about a switch 114. As shown in FIG. 3B, the user may scroll left or right to display different components or connections.

Those skilled in this art will recognize that other icons representing other components or connections may also be employed, including: personal computers; phones; printers; fax machines; wireless access points; consolidation points; splice enclosures; mainframe computers; server computers; LAN switches; environmental monitoring devices; storage devices (in storage area networks); private branch exchanges; point-of-sale terminals; and security cameras.

The real-time display of the endpoint information may be particularly useful to technicians during patching, as it may allow them to verify that the patch cord connection they have made has indeed connected the intended equipment (for example, a particular LAN switch port to a particular desktop computer). The end-to-end trace information may be updated in real time each time the user inserts or removes a patch cord plug; such information is particularly useful when it is displayed at the patch panel or rack at which the user is working. For example, if the user removes one end of an existing patch cord, the display may show not only the two connector ports in the local closet that have been disconnected, but also the endpoints of the circuit that has been broken. If the user then places the free end of the patch cord in question in a different connector port, the trace information may be updated on the right side of the screen to show both the new patch panel connector port and the endpoint of the new circuit that has been created. If the user is not satisfied with this connection, and moves the patch cord plug to yet another connector port, the trace information may be updated accordingly. All of this information can help the user to validate patching connections and changes, including starting and destination ports.

In another embodiment, an intelligent patching system may include real-time search capabilities. The rack controller 36 may have a touch-screen or other display that allows the user to enter text information. Using this data entry mechanism, users may be able to search for nodes in the cabling system (such as a particular wall jack faceplate or telecom outlet), and/or for equipment attached to the cabling system (such as a computer with a particular IP address or MAC ID, or a switch port assigned to a particular VLAN). Exemplary searchable items include: device names; IP addresses (either specifically or within a range); VLAN IDs; MAC addresses; faceplate names; switch names; work order IDs; cable IDs; cable types' and services.

Once the user has entered the query information, the rack controller sends the request to the system manager, which queries its database and returns the requested information. This information may be displayed to the user on the rack controller's graphical display. If the circuit in question passes through the patching zone where the rack controller used for the query is located, it will light the LED(s) of any panel ports that are utilized in the circuit in question; if not, the user may still be able to determine from the display which other wiring closet local patching field or the like he may visit in order to access the circuit in question.

As an enhancement to this embodiment, it would be possible to provide the user an option that would light the LEDs in all panel ports at the site that are used to implement the circuit in question. This variation may facilitate location of patch cords associated with the circuit at each wiring closet through which the circuit passes. Thus, by identifying a circuit with one of the search term identifiers, the user can have the ports associated with that circuit illuminated for easy identification, which in turn can facilitate patching validation and changes.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A telecommunications patching system having point-to-point tracing capabilities, comprising:
   a plurality of patch panels each configured to mount to a rack structure;
   a plurality of connector ports disposed on each of the patch panels, wherein the connector ports of the patch panels are configured to selectively interconnect with respective end devices through a plurality of cables, and wherein the connector ports of the patch panels are configured to be selectively interconnected with each other through a plurality of patch cords;

tracing modules associated with said connector ports and end devices that monitor connectivity of the connector ports and end devices; and a graphical user interface display associated with the tracing modules configured to graphically display at least a portion of a circuit comprising one or more of the connector ports and one or more of the end devices.

2. The patching system defined in claim 1, wherein the tracing modules are associated with a database that includes information regarding fixed cabling and the connector ports of the patch panels.

3. The patching system defined in claim 1, wherein the graphical user interface display may display one or more icons of or representing: faceplates; wall jacks; patch panels; connector ports; patch cords; external data service; personal computers; phones; printers; fax machines; wireless access points; consolidation points; splice enclosures; mainframe computers; server computers; LAN switches; environmental monitoring devices; storage devices; private branch exchanges; point-of-sale terminals; and security cameras.

4. The patching system defined in claim 1, wherein the graphical user interface display may display one or more icons that expand to display additional information about a component of the circuit.

5. A method of interconnecting telecommunications devices, comprising the steps of:

(a) providing an intelligent patch system having:
a plurality of patch panels each mounted to a rack structure;
a plurality of connector ports disposed on each of the patch panels,
wherein the connector ports of the patch panels are configured to selectively interconnect with respective end devices through a plurality of cables, and wherein the connector ports of the patch panels are configured to be selectively interconnected with each other through a plurality of patch cords;
tracing modules associated with said connector ports and end devices that monitor connectivity of the connector ports and end devices; and
a graphical user interface display associated with the tracing modules configured to graphically display at least a portion of a circuit comprising one or more of the connector ports and one or more of the end devices;

(b) moving one of the patch cords from one of the connector ports to another of the connector ports; and (c) illuminating on the graphical user interface display icons representing components or connections for at least a portion of a new patching circuit formed by the patch cord moved in step (b) to verify the correctness of the new patching circuit.

6. The method defined in claim 5, wherein the tracing modules are associated with a database that includes information regarding fixed cabling and the connector ports of the patch panels.

7. The method defined in claim 5, wherein the graphical user interface display may display one or more icons of or representing: faceplates; wall jacks; patch panels; connector ports; patch cords; external data service; personal computers; phones; printers; fax machines; wireless access points; consolidation points; splice enclosures; mainframe computers; server computers; LAN switches; environmental monitoring devices; storage devices; private branch exchanges; point-of-sale terminals; and security cameras.

8. The method defined in claim 5, wherein the graphical user interface display may display one or more icons that expand to display additional information about a component of the circuit.

9. A telecommunications patching system having point-to-point tracing capabilities, comprising:

a plurality of patch panels each configured to mount to a rack structure;

a plurality of connector ports disposed on each of the patch panels, wherein the connector ports of the patch panels are configured to selectively interconnect with respective end devices through a plurality of cables, and wherein the connector ports of the patch panels are configured to be selectively interconnected with each other through a plurality of patch cords;

tracing modules associated with said connector ports and end devices that monitor connectivity of the connector ports and end devices; and a controller configured to receive search criteria and graphically display search results conforming to the search criteria and regarding the end devices, patch panels, ports, patch cords and cables.

10. The telecommunications patching system defined in claim 9, wherein the tracing modules are associated with a database that includes information regarding fixed cabling and the connector ports of the patch panels.

11. The telecommunications patching system defined in claim 10, wherein the tracing modules further comprise indicator lights associated with the connector ports, and wherein the controller is configured to, upon request, illuminate the indicator lights associated with a patching circuit identified in its search results.

12. The telecommunications patching system defined in claim 9, wherein the tracing modules are associated with a database that includes information regarding fixed cabling and the connector ports of the patch panels.

* * * * *